US011970979B2

(12) United States Patent
Johnson et al.

(10) Patent No.: US 11,970,979 B2
(45) Date of Patent: Apr. 30, 2024

(54) TURBINE ENGINE WITH SHOCKWAVE ATTENUATION

(71) Applicant: General Electric Company, Schenectady, NY (US)

(72) Inventors: Christopher Ryan Johnson, Fairfield, OH (US); Paul Hadley Vitt, Liberty Township, OH (US); Eric Joseph Schroeder, Loveland, OH (US); Carlos Gilberto Fernandez-Soto, Fairfield Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/979,057

(22) Filed: Nov. 2, 2022

(65) Prior Publication Data

US 2023/0059927 A1   Feb. 23, 2023

Related U.S. Application Data

(63) Continuation of application No. 17/016,670, filed on Sep. 10, 2020, now Pat. No. 11,519,333.

(51) Int. Cl.
*F02C 7/24* (2006.01)

(52) U.S. Cl.
CPC .................... *F02C 7/24* (2013.01)

(58) Field of Classification Search
CPC .... F02C 7/24; F02C 7/18; F01D 5/186; F01D 5/183; F01D 5/18; F01D 5/14; F01D 5/141; F01D 5/145; F02D 5/00; F04D 29/661; F04D 29/663; F04D 29/665; F04D 29/667; F04D 29/681; F05D 2260/96; F05D 2260/962; F05D 2260/963; F05D 2250/181; F05D 2250/28; F05D 2250/283; F05D 2250/11; F05D 2250/18; F05D 2250/292; F05D 2250/61; F05D 2250/611; F05D 2250/192
See application file for complete search history.

(56) References Cited

U.S. PATENT DOCUMENTS

| 4,720,239 | A | * | 1/1988 | Owczarek ............... F01D 5/141 |
| | | | | 415/181 |
| 4,944,362 | A | | 7/1990 | Motsinger et al. |
| 7,685,806 | B2 | | 3/2010 | Gupta et al. |
| 8,157,050 | B2 | | 4/2012 | Huber et al. |
| 8,234,869 | B2 | | 8/2012 | Tuan |

(Continued)

FOREIGN PATENT DOCUMENTS

| CN | 101716995 A | * | 6/2010 |
| CN | 101716995 A | | 6/2010 |
| WO | 2018/037456 A1 | | 3/2018 |

OTHER PUBLICATIONS

Encyclopaedia Britannica, Shock wave, Sep. 5, 2015.*

(Continued)

*Primary Examiner* — Todd E Manahan
*Assistant Examiner* — Rodolphe Andre Chabreyrie
(74) *Attorney, Agent, or Firm* — McGarry Bair PC

(57) ABSTRACT

A turbine engine and method of operating includes an engine core with a compressor, a combustor, and a turbine in axial flow arrangement. A flow path extends through the engine core from the compressor to the turbine to define a flow direction for a working airflow through the engine core.

18 Claims, 8 Drawing Sheets

(56) References Cited

U.S. PATENT DOCUMENTS

| | | |
|---|---|---|
| 8,739,508 B1 | 6/2014 | Clark |
| 8,757,319 B2 | 6/2014 | Bouteiller et al. |
| 11,203,935 B2* | 12/2021 | Hiernaux .............. F04D 29/681 |
| 2010/0104446 A1* | 4/2010 | Vehr ....................... F01D 5/147 |
| | | 416/241 R |
| 2015/0023780 A1* | 1/2015 | Costa .................... F04D 29/526 |
| | | 415/170.1 |
| 2015/0219013 A1 | 8/2015 | Huber et al. |
| 2019/0112979 A1 | 4/2019 | Regnard et al. |

OTHER PUBLICATIONS

GE Training, Training Manual CFM56-ALL, Borescope Inspection, Aug. 2000, CTC-229 Level 3.
Shock-wave/Boundary-layer interaction, Neild D. Sandham, 2011.

* cited by examiner

TURBINE ENGINE WITH SHOCKWAVE ATTENUATION

CROSS-REFERENCE TO RELATED APPLICATION(S)

This application is a continuation of U.S. patent application Ser. No. 17/016,670, filed Sep. 10, 2020, now U.S. Pat. No. 11,519,333, which is incorporated herein by reference in its entirety.

FEDERALLY SPONSORED RESEARCH

This invention was made with government support. The government may have certain rights in the invention.

TECHNICAL FIELD

The disclosure generally relates to turbine engines, and more particularly to a turbine engine configured to attenuate shockwaves within the engine.

BACKGROUND

Turbine engines, and particularly gas or combustion turbine engines, are rotary engines that extract energy from process air or working air that flows through the engine through multiple compressor stages, through a combustor, and then through multiple turbine stages. The compressor and turbine stages include axially-arranged pairs of rotating blades and stationary vanes.

During engine operation, rotation of blades can cause flow disturbances, such as shockwaves, within the working air flow as it axially progresses through the engine. The shockwaves can propagate through the engine and encounter components located therein creating pressure disturbances that negatively impact the axial flow of the working air, which leads to reduced operation efficiency of the engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
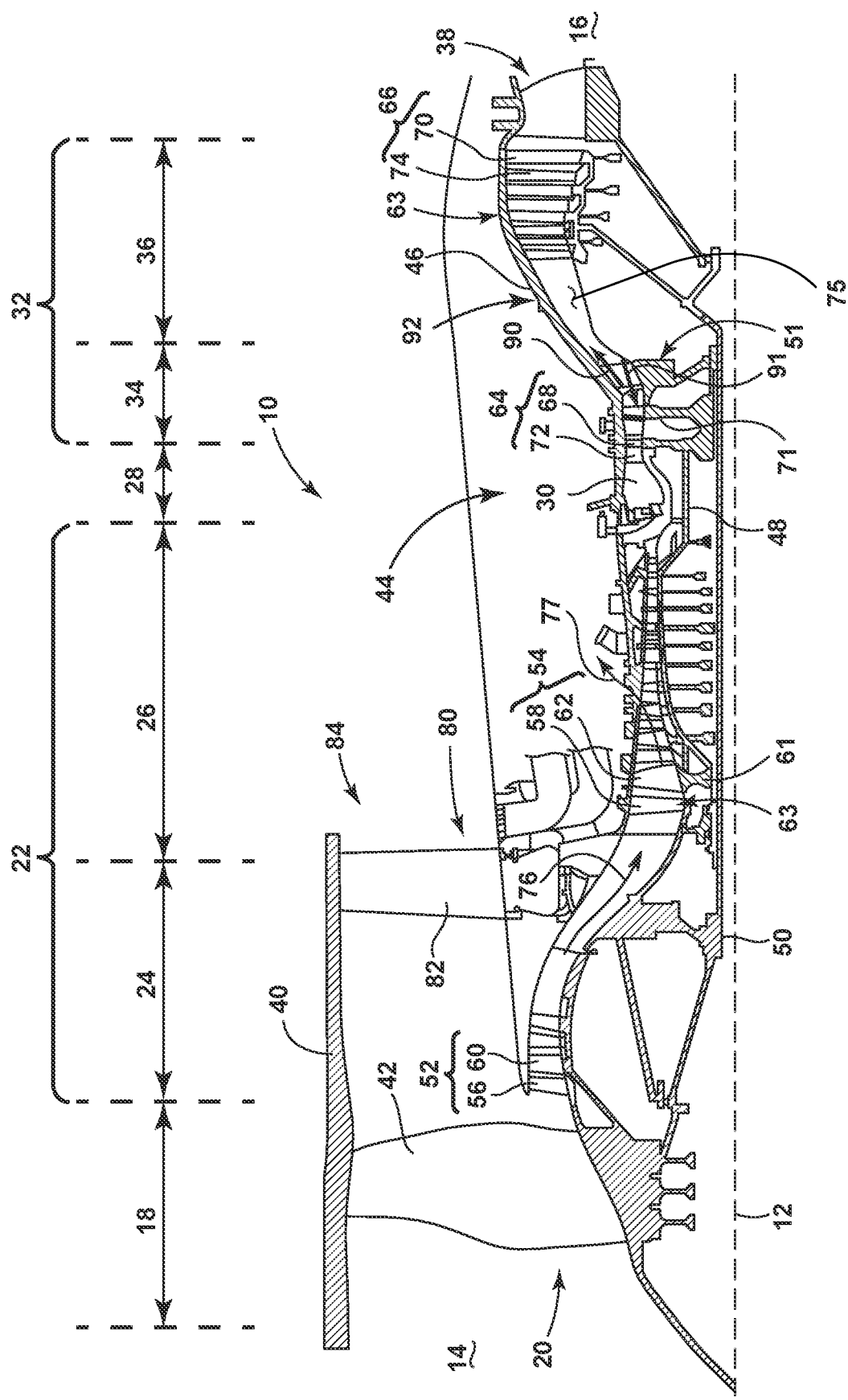
FIG. 1 is a schematic cross-sectional diagram of a gas turbine engine for an aircraft including an exemplary component in the form of a turbine center frame in accordance with various aspects described herein.

Recent trends in engine technology, including turbomachinery technology, have generated an increase in turbine blade loading requirements, including local Mach numbers and the subsequent generation of compressible-flow phenomena such as shockwaves and expansion waves in the working airflow. Such flow features can propagate downstream along the engine flowpath, creating pressure losses and lowered efficiency in downstream components. In addition, some shockwaves can reflect off downstream components and create subsequent aerodynamic effects that negatively impact system performance as well. Furthermore, some engine architectures feature closely coupled high-pressure turbines (HPTs) and low-pressure turbines (LPTs) that can result in increased aerodynamic or aeroelastic interactions between the HPT and the LPT. Aspects of the disclosure relate to the mitigation or attenuation of such flow phenomena, including shockwaves, through the use of surface features on engine components that may be exposed to shockwaves or reflected shockwaves in the flow path.

For the purposes of illustration, one exemplary component will be described in the form of a turbine engine having a turbine center frame positioned between a high pressure turbine and a low pressure turbine. Such a turbine engine can be in the form of a gas turbine engine, a turboprop, a turboshaft, or a turbofan engine, in non-limiting examples. It will be understood, however, that aspects of the disclosure described herein are not so limited and can have general applicability with other turbine engine components or within other engine systems. For example, the disclosure can have applicability for systems in other engines or vehicles, and may be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the term "shockwave" or "shock" will broadly refer to a flow disturbance in the form of a rapid or sharp pressure wave traveling or propagating in a medium. Such a shockwave as used herein can travel faster or slower than the sound speed through that medium. In one example, a shockwave can be generated by movement of a body through a medium at a high speed relative to the sound speed in that medium, such as greater than 80% of the sound speed, or between 70%-150% of the sound speed, in non-limiting examples. In another example, a shockwave can be generated by supersonic expansion of a fluid flowing over or through a stationary body. In still another example, a shockwave can refer to a pressure wave within a subsonic fluid flow.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, fixed, connected, joined, and the like) are to be construed broadly and can include intermediate members between a collection of elements and relative movement between elements unless otherwise indicated. As such, connection references do not necessarily infer that two elements are directly connected and in fixed relation to one another. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The LP compressor 24, the HP compressor 26, the combustor 30, the HP turbine 34, and the LP turbine 36 collectively form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled along a flow path 75 extending through the core 44 and defining a flow direction 76. More specifically, the airflow moves along the flow path 75 into the LP compressor 24, which then supplies pressurized air to the HP compressor 26, which further pressurizes the air along the flow path 75. The pressurized air from the HP compressor 26 is mixed with fuel in the combustor 30 and ignited, thereby generating combustion gases to form a working airflow. Some work is extracted from these gases by the HP turbine 34, which drives the HP compressor 26. The combustion gases are discharged into the LP turbine 36, which extracts additional work along the flow path 75 to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow can be drawn from the compressor section 22 as bleed air 77. The bleed air 77 can be drawn from the pressurized airflow and provided to engine components requiring cooling. The temperature of pressurized airflow entering the combustor 30 is significantly increased above the bleed air temperature. The bleed air 77 may be used to reduce the temperature of the core components downstream of the combustor.

A remaining portion of the airflow bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow.

In addition, during operation, a shockwave 90 can be generated in the working airflow within the engine core 44. In one example, rotation of a set of airfoils, such as the HP turbine blades 68, can cause the HP turbine blades 68 to move with sufficient speed through the working airflow to generate the shockwave 90. In another non-limiting example, the shockwave 90 can be generated by supersonic expansion between adjacent HP turbine vanes 72. In still another example, rotation of upstream HP turbine blades 68 can at least partially form the working airflow, and the shockwave 90 can be formed or generated within the working airflow by the rotating HP turbine blades 68, or by supersonic expansion of the working airflow between adjacent HP turbine vanes 72, or the like, or any combination thereof. Regardless of how it is formed, the shockwave 90 can propagate or travel along the flow path 75 and encounter other components within the engine core 44, such as another HP turbine blade 68, HP turbine vane 72, LP turbine blade 70, LP turbine vane 74, core casing 46, or the like. The shockwave 90 represents a flow disturbance within the working airflow, such as a rapid increase in pressure that propagates through combustion gases in the engine core 44.

Part of the shockwave 90 can also reflect off an engine component to define a reflected portion 91 moving upstream, i.e. opposite the flow direction 76, through the engine core 44 as shown. The reflected portion 91 can propagate upstream and also encounter other components within the engine core 44, including an HP turbine blade 68, HP turbine vane 72, LP turbine blade 70, LP turbine vane 74, core casing 46, or the like. The shockwave 90 and reflected portion 91 represent flow disturbances that can interfere with the normal or standard axial flow of the working airflow through the engine core 44.

For visual clarity, the shockwave 90 and reflected portion 91 are illustrated herein with arrows. It should be understood that such arrows represent a direction of travel of the shockwave 90 and reflected portion 91 as is generally understood for wave phenomena. It should also be understood that the shockwave 90 and reflected portion 91 can encounter multiple components within the engine core 44, including reflecting off multiple components to form additional reflected portions. For the purposes of visual clarity, a single shockwave 90 and a single reflected portion 91 will be illustrated, and it will be understood that multiple shockwaves 90 and reflected portions 91 can be present within the working airflow.

In addition, for the purposes of illustration, one exemplary component that can encounter the shockwave 90 or reflected portion 91 will be described in the form of a turbine center frame 92 provided between the HP turbine 34 and the LP turbine 36. It will be understood that the disclosure is not so limited, and aspects of the disclosure can also be applied to other components within the engine 10, including portions of the HP turbine 34, LP turbine 36, core casing 46, or an inter-turbine duct or endwall, or the like.

Turbine center frames (also known as turbine mid frames) are typically utilized in a transitional duct between high and low pressure turbines. Such frames can provide for diffusing or smoothing of a turbulent airflow exiting the high pressure turbine before entering the low pressure turbine. The airflow entering turbine center frames can have unsteady, three-dimensional and non-uniform turbulent motion. These flow characteristics typically lead to high levels of mixing and poor performance. Turbine center frames typically include airfoils to divide, turn, or accelerate the airflow for diffusing or smoothing purposes as described above.

Figure 2:
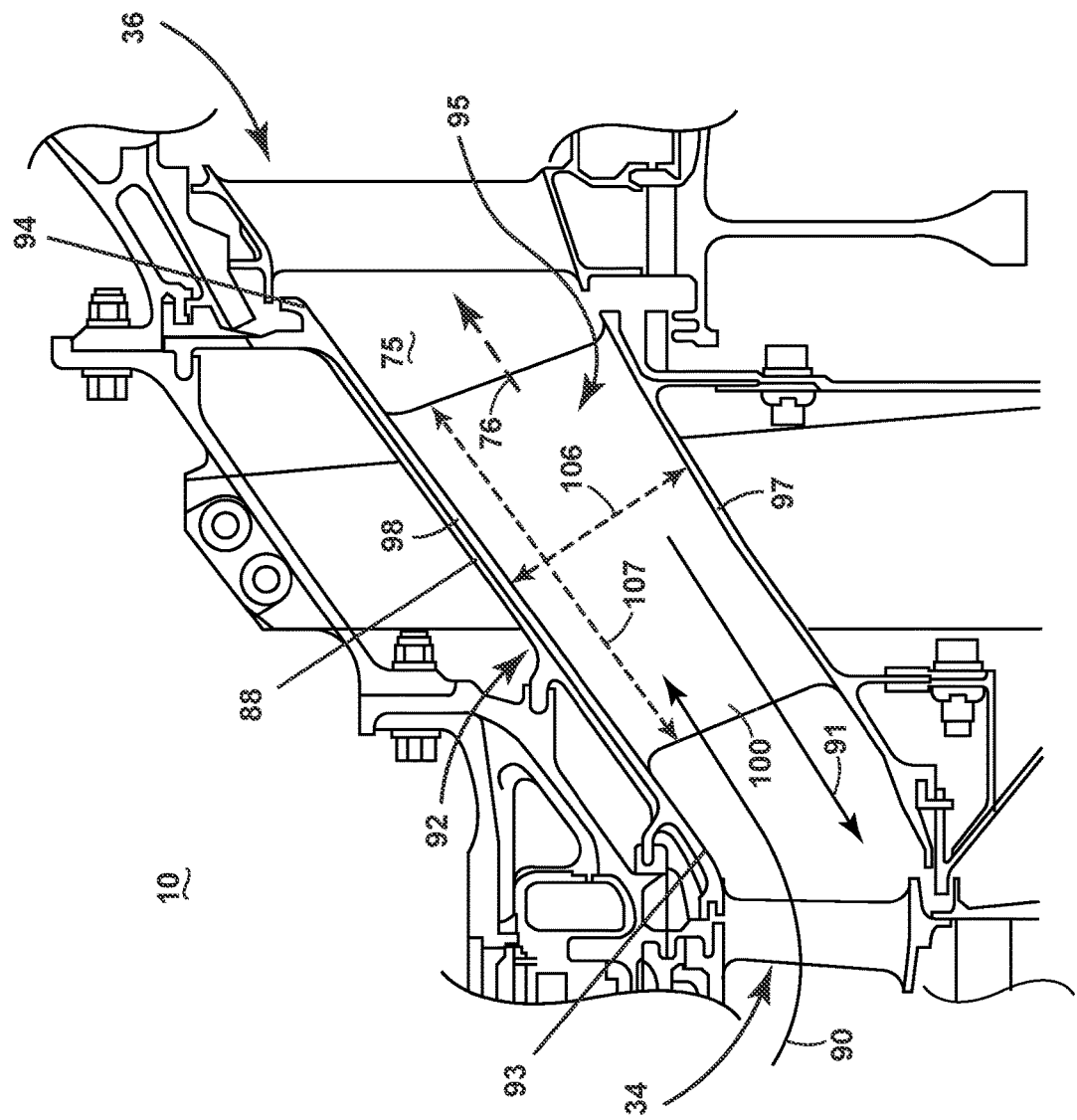
FIG. 2 is a schematic cross-sectional diagram of the turbine center frame of FIG. 1.

FIG. 2 illustrates the turbine center frame 92 in further detail. The turbine center frame 92 is part of a transition duct 88 provided between the HP turbine 34 and the LP turbine 36. The turbine center frame 92 can extend from an inlet 93 at the aft end of the HP turbine 34 to an outlet 94 at the forward end of the LP turbine 36.

The turbine center frame 92 includes a set of airfoils 95. The set of airfoils 95 can be utilized to modify a flow of fluid exhausting from the HP turbine 34, such as by diffusing, smoothing, accelerating, or reducing turbulence, thereby providing for a more smooth airflow into the LP turbine 36 and extracting more work from the airflow as described above.

The set of airfoils 95 are illustrated within the turbine center frame 92. In the example shown, one exemplary airfoil 100 in the set of airfoils 95 can extend between a radially inner wall 97 and a radially outer wall 98 within the turbine center frame 92. A spanwise height 106 and a chordwise length 107 of the airfoil 100 is shown for reference. The set of airfoils 95 can include any suitable number of stationary or rotating airfoils.

The shockwave 90 and reflected portion 91 are also shown within the engine core 44. For the purposes of illustration, the shockwave 90 will be described as originating from a portion of the HP turbine 34, moving through the turbine center frame 92, encountering the set of airfoils 95, and reflecting off a portion of the LP turbine 36 to form the reflected portion 91. It will be understood that the shockwave 90 and reflected portion 91 can be generated by any suitable engine component within the core 44.

Figure 3:
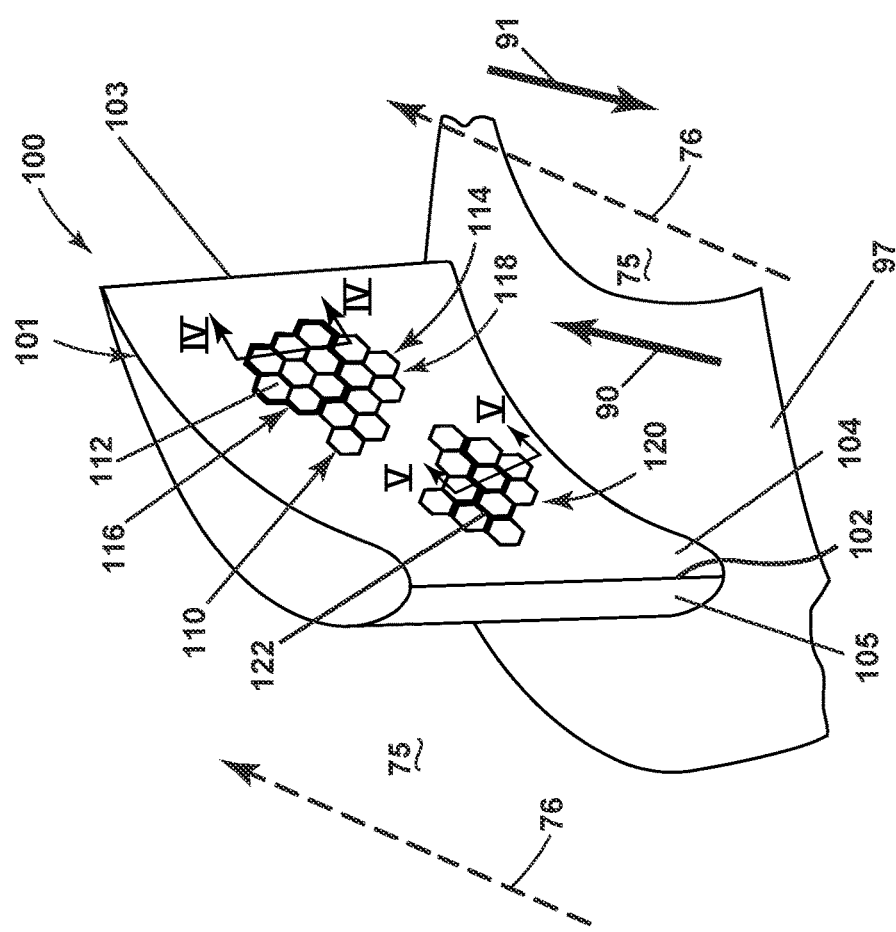
FIG. 3 is a schematic perspective view of an airfoil that can be utilized in the turbine center frame of FIG. 1 having an attenuation structure in accordance with various aspects described herein.

Turning to FIG. 3, the exemplary airfoil 100 is illustrated that can be utilized in the turbine center frame 92. It will be understood that aspects of the disclosure can be utilized in any airfoil within the turbine engine 10, including any rotating or non-rotating airfoil at any location within the turbine engine 10. The airfoil 100 has an outer wall 101 extending from a leading edge 102 to a trailing edge 103 and defining a pressure side 104 and suction side 105. At least one attenuation structure 110 can be provided with the airfoil 100 and is illustrated as being located on the pressure side 104. In the example shown, the attenuation structure 110 is in the form of multiple planar structures along the outer wall, illustrated as hexagonal or "honeycomb" structures 112. In one example, the honeycomb structures 112 can be formed of the same material as the outer wall 101. Alternately, the honeycomb structures 112 can include a different material compared to the outer wall 101. It will be understood that the attenuation structure 110 can be located anywhere on the airfoil 100, radially inner wall 97, or radially outer wall 98 (FIG. 2). In another non-limiting example wherein the airfoil 100 is in the form of a blade extending from a platform, the at least one attenuation structure can be located on the blade, the platform, or combinations thereof. In still another non-limiting example wherein the airfoil 100 is in the form of a vane extending between an inner band and an outer band, the at least one attenuation structure can be provided on the vane, inner band, outer band, or combinations thereof.

A first set 114 of honeycomb structures 112 is shown proximate the trailing edge 103. The first set 114 of honeycomb structures 112 includes a first panel 116 and a second panel 118. The first panel 116 can protrude farther into the flow path 75 compared to the second panel 118, thereby forming a "raised" first panel 116.

In addition, a second set 120 of honeycomb structures 112 is shown proximate the trailing edge 103. A boundary between adjacent honeycomb structures 112 can form a raised ridge 122 projecting or protruding into the flow path 75. The ridge 122 can be continuous or discontinuous over the outer wall 101; multiple ridges 122 can also be provided.

It will be understood that the illustrated arrangement of honeycomb structures 112 in FIG. 3 is provided for the purposes of illustration and is not intended to limit the disclosure. Multiple honeycomb structures 112 can be utilized on any portion of the airfoil 100, including covering the entire outer wall 101, or a portion thereof. In one non-limiting example, the pressure side 104 can be covered by multiple first panels 116 and second panels 118 while the suction side 105 can be covered by multiple raised ridges 122.

Figure 4:
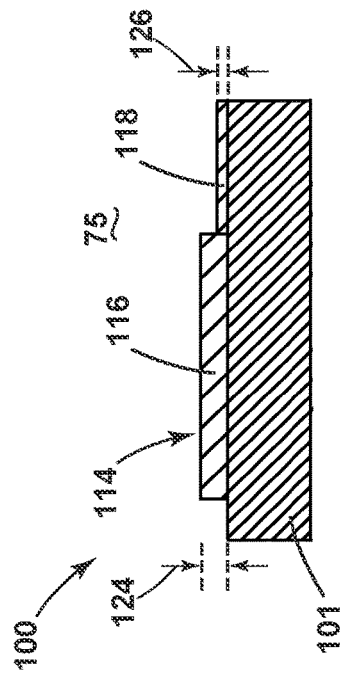
FIG. 4 is a cross-sectional view of a portion of the airfoil of FIG. 3 along line IV-IV.

FIG. 4 illustrates the first panel 116 and second panel 118 in cross-section. The first panel 116 defines a first panel height 124 and the second panel 118 defines a second panel height 126 as shown. In the example shown, the first panel height 124 is larger than the second panel height 126, such that the first panel 116 protrudes farther into the flow path 75 as described above though this need not be the case. In non-limiting examples, the first panel height 124 or the second panel height 126 can be between 1 mm and 7 mm, or between 5 mm and 50 mm, or between 1 cm and 10 cm. Additionally or alternatively, the first panel height 124 or the second panel height 126 can be sized relative to a dimension of the airfoil 100. For example, either or both of the first panel height 124 or the second panel height 126 can be between 0% and 1% of the spanwise height 106 of the airfoil 100, or between 0% and 2% of the spanwise height 106, or between 0% and 10% of the chordwise length 107 of the airfoil 100, in non-limiting examples. It is further contemplated that the first panel height 124 can be equal to the second panel height 126.

Figure 5:
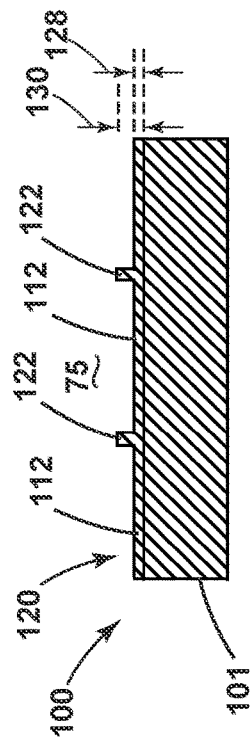
FIG. 5 is a cross-sectional view of another portion of the airfoil of FIG. 3 along line V-V.

FIG. 5 illustrates the ridges 122 between adjacent honeycomb structures 112 in a cross-sectional view. The honeycomb structures 112 are shown as a layer provided on the outer wall 101 and having a layer height 128. The ridges 122 can define a ridge height 130 greater than the layer height 128 as measured from the outer wall 101. In non-limiting examples, the layer height 128 can be between 1 mm and 5 mm, or between 5 mm and 50 mm, or between 1 cm and 10 cm. In other non-limiting examples, the ridge height 130 can be between 2 mm and 10 mm, or between 7 mm and 60 mm, or between 1 cm and 10 cm. It is further contemplated that the ridge height 130 can be sized, formed, designed, or the like with respect to a dimension of the airfoil 100, including between 0% and 2% of the spanwise height 106 of the airfoil 100, or between 0% and 2% of the chordwise length 107 of the airfoil 100, in non-limiting examples.

During operation, either or both of the shockwave 90 or the reflected portion 91 (FIG. 3) can propagate along the flow path 75 and flow along or over the outer wall 101. The shockwave can encounter the at least one attenuation structure 110 protruding into the flow path 75, including the ridges 122, raised first panel 116, or second panel 118 of either or both of the first set 114 or second set 120 of honeycomb structures 112. The attenuation structure 110 can be configured to at least partially attenuate the shockwave 90 or the reflected portion 91 flowing thereon. "Attenuating" (also referred to as "dissipating," "damping," or "dispersing") can include absorbing energy carried by the shockwave 90 or reflected portion 91, reducing an amplitude of the shockwave 90 or reflected portion 91, reducing or preventing a reflection of the shockwave 90 or reflected portion 91, scattering the shockwave 90 or reflected portion 91, or the like, or combinations thereof.

As the shockwave 90 or reflected portion 91 encounter the outer wall 101, portions of the attenuation structure 110 protruding into the flow path 75, e.g. the ridges 122, raised first panel 118, or second panel 120, can function as elastic members that can vibrate, resonate, or the like to absorb energy carried by the shockwave 90 or reflected portion 91. Such a transfer of energy causes the shockwave 90 or reflected portion 91 to reduce in amplitude, dampen, or the like, thereby at least partially attenuating the shockwave 90 or reflected portion 91. Such a transfer of energy can also reduce or prevent reflection of the shockwave 90 or reflected portion 91 from the outer wall 101, as compared to a smooth or planar outer wall that provides for rebounding of incident surface waves or flow disruptions. In this manner the attenuation structure 110 can be in the form of a protruding surface irregularity on an engine component within the flow path 75 and configured to attenuate the shockwave 90 or the reflected portion 91.

Figure 6:
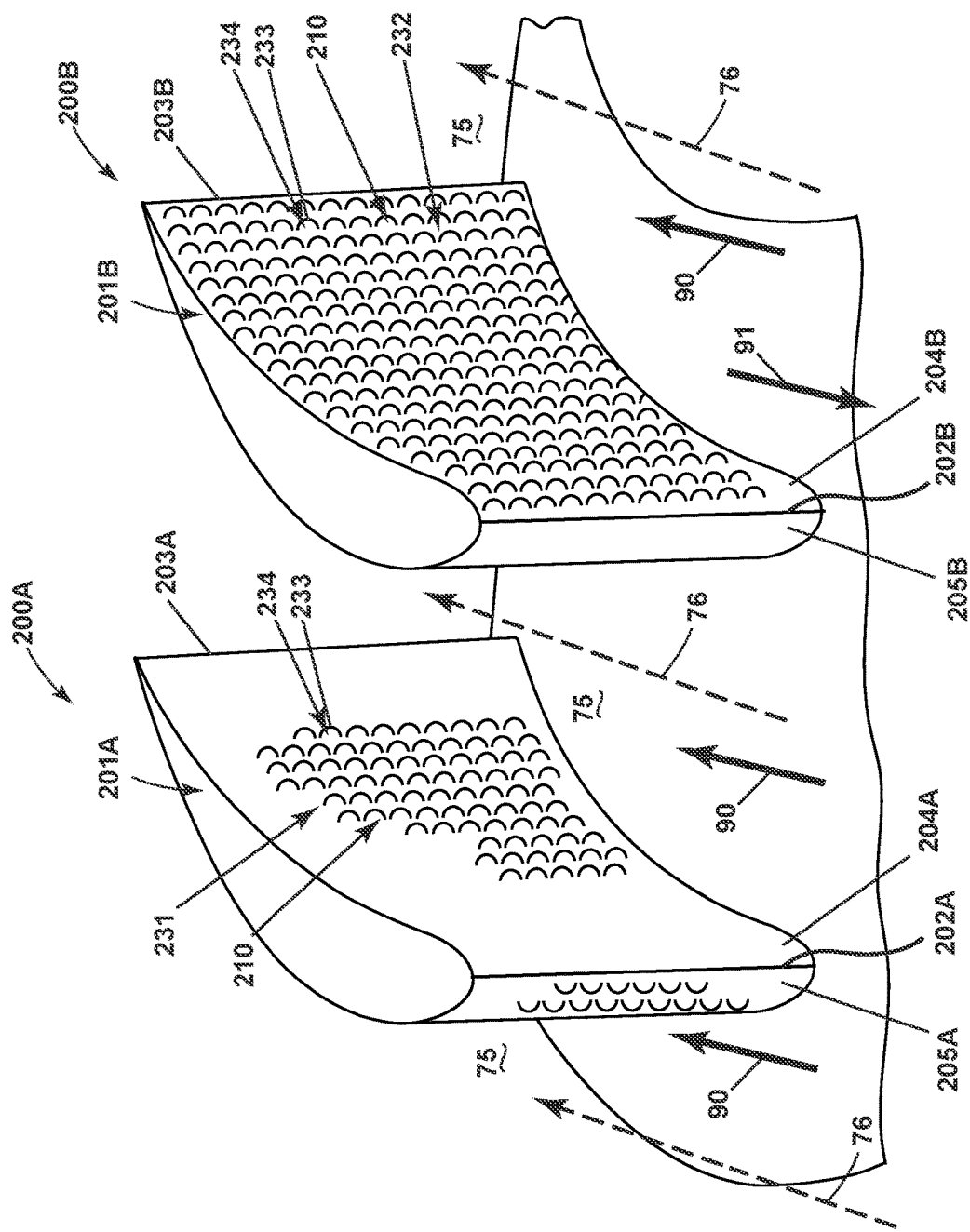
FIG. 6 is a schematic perspective view of a pair of airfoils that can be utilized in the turbine center frame of FIG. 1 with another attenuation structure in accordance with various aspects described herein.

Referring now to FIG. 6, a first airfoil 200A and a second airfoil 200B are illustrated that can be utilized in the turbine center frame 92. The first airfoil 200A and second airfoil 200B are similar to the airfoil 100. Therefore, like parts will be identified with like numerals increased by 100 and appended with either -A or -B, with it being understood that the description of the like parts of the airfoil 100 applies to the first airfoil 200A and the second airfoil 200B, except where noted.

The first airfoil 200A is circumferentially-spaced from the second airfoil 200B. The first airfoil 200A and the second airfoil 200B have a respective first outer wall 201A and second outer wall 201B. The first outer wall 201A extends from a first leading edge 202A to a first trailing edge 203A and defines a first pressure side 204A and a first suction side 205A. The second outer wall 201B extends from a second leading edge 202B to a second trailing edge 203B and defines a second pressure side 204B and a second suction side 205B. The first and second airfoils 200A, 200B can be in the form of stationary vanes extending radially from the radially inner wall 97 to the radially outer wall 98 (FIG. 2; not shown in FIG. 6 for visual clarity) of the turbine center frame 92.

In addition, at least one attenuation structure 210 can be provided on at least one of the first airfoil 200A or the second airfoil 200B. In the example shown, the at least one attenuation structure 210 is in the form of a first set 231 of scaled structures 234 on the first outer wall 201A and a second set 232 of scaled structures 234 on the second outer wall 201B, each having a curved outer surface 233 protruding into the flow path 75. In the example shown, each of the first set 231 and second set 232 of scaled structures 234 can protrude into the flow path 75 from the respective first pressure side 204A and second pressure side 204B though this need not be the case.

The first set 231 is shown over a portion of the first pressure side 204A. The second set 232 is shown covering the entirety of the second pressure side 204B. It will be understood that any number of scaled structures 234 can be utilized in the first set 231 and second set 232, in any pattern or arrangement, and on any portion of the first outer wall 201A or second outer wall 201B, including the first pressure side 204A, second pressure side 204B, first suction side 205A, or second suction side 205B. Furthermore, the scaled structures 234 are shown in the example of FIG. 6 with outer surfaces 233 having a generally U-shaped geometric profile. It will be understood that the outer surfaces 233 of the scaled structures 234 can have any suitable geometric shape or size, including hemispherical, parabolic, dimpled, symmetric, asymmetric, or the like, or combinations thereof.

During operation, the shockwave 90 or reflected portion 91 can propagate along the flow path 75 between the first airfoil 200A and the second airfoil 200B. The shockwave 90 can move or flow along the first outer wall 201A or second outer wall 201B and encounter the attenuation structure 210, i.e. either or both of the first and second sets 231, 232 of scaled structures 234 that protrude into the flow path 75. As the shockwave 90 or reflected portion 91 moves along the scaled structures 234, the curved outer surface 233 of each scaled structure 234 can reflect portions of the shockwave 90 or reflected portion 91 along multiple differing directions, thereby scattering or dispersing the shockwave 90 or reflected portion 91. The first and second sets 231, 232 of scaled structures 234 can therefore be configured to at least partially attenuate the shockwave 90 or the reflected portion 91 as described above.

Figure 7:
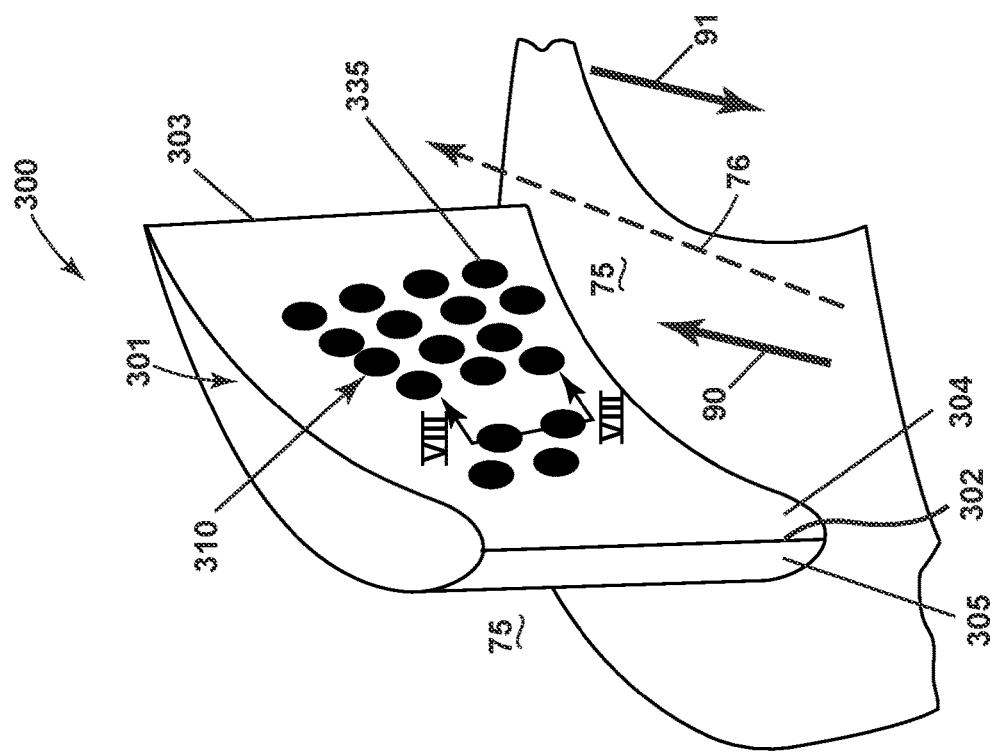
FIG. 7 is a schematic perspective view of another airfoil that can be utilized in the turbine center frame of FIG. 1 with another attenuation structure in accordance with various aspects described herein.

Referring now to FIG. 7, another airfoil 300 is illustrated that can be utilized in the turbine center frame 92. The airfoil 300 is similar to the airfoils 100, 200A, 200B. Therefore, like parts will be identified with like numerals further increased by 100, with it being understood that the description of the like parts of the airfoil 100, 200A, 200B applies to the airfoil 300, except where noted.

The airfoil 300 has an outer wall 301 extending from a leading edge 302 to a trailing edge 303 and defining a pressure side 304 and suction side 305. At least one attenuation structure 310 can be provided on the outer wall 301 and is illustrated as being located on the pressure side 304. One difference is that the attenuation structure 310 is in the form of a resonator cavity 335 extending into the outer wall 301. In the example shown, multiple resonator cavities 335 are provided along the pressure side 304. It is contemplated that any number of resonator cavities 335 can be provided along any portion of the outer wall 301, and in any suitable arrangement or pattern.

Figure 8:
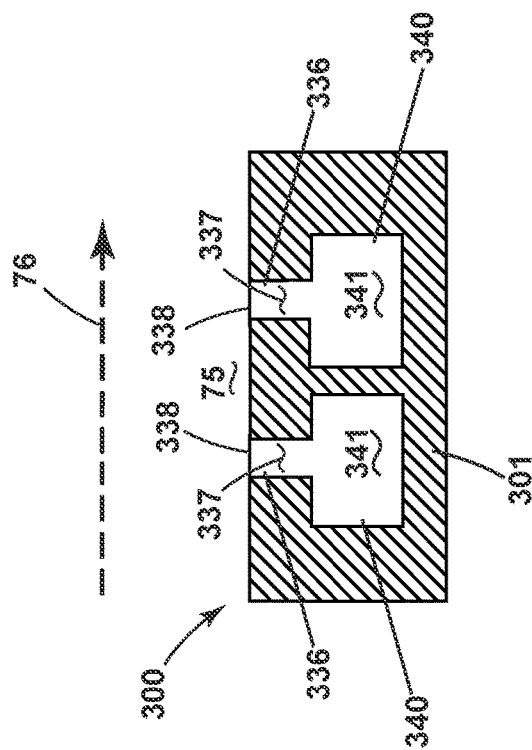
FIG. 8 is a cross-sectional view of a portion of the airfoil of FIG. 6 along line VIII-VIII.

FIG. 8 illustrates two resonator cavities 335 in cross-section. Each resonator cavity includes a neck 336 defining a neck volume 337 with an opening 338 on the outer wall 301 fluidly coupled to the flow path 75 (FIG. 7). A chamber 340 is located within the outer wall 301 and defines a chamber volume 341 fluidly coupled to the neck 336. While the chamber 340 and neck 336 are illustrated as having essentially rectangular geometric profiles, any suitable geometric profile can be utilized, including round, curved, asymmetric, or irregular geometric profiles.

The relative sizes of the chamber volume 341 and neck volume 337 can be selected or designed to attenuate a particular frequency or range of frequencies of the shockwave 90 moving through the flow path 75. Put another way, the resonator cavities 335 can define Helmholtz resonators that can be tuned to attenuate acoustic waves, including the shockwave 90, flowing over the airfoil 300. The resonator cavities 335 can all be identical, or they can have varying chamber volumes 341 and neck volumes 337 at different portions of the outer wall 301. In yet another example (not shown), a first airfoil can have a first set of resonator cavities all tuned to a first frequency, while a second airfoil can have a second set of resonator cavities all tuned to a second frequency.

In operation, the shockwave 90 or the reflected portion 91 can flow over the outer wall 301 of the airfoil 300. Air inside the resonator cavities 335 can resonate in response to the presence of the shockwave 90 or the reflected portion 91, thereby removing energy from the shockwave 90 or the reflected portion 91 and at least partially dissipating the shockwave 90 or the reflected portion 91. It is further contemplated that the energy absorbed from the shockwave 90 or reflected portion 91 can be released back into the flow path 75 via resonation of the air inside the resonator cavities 335 as is generally known in the art. In this manner the attenuation structure 310 can be in the form of a resonating mechanism providing for damping of the shockwave 90 or the reflected portion 91.

Figure 9:
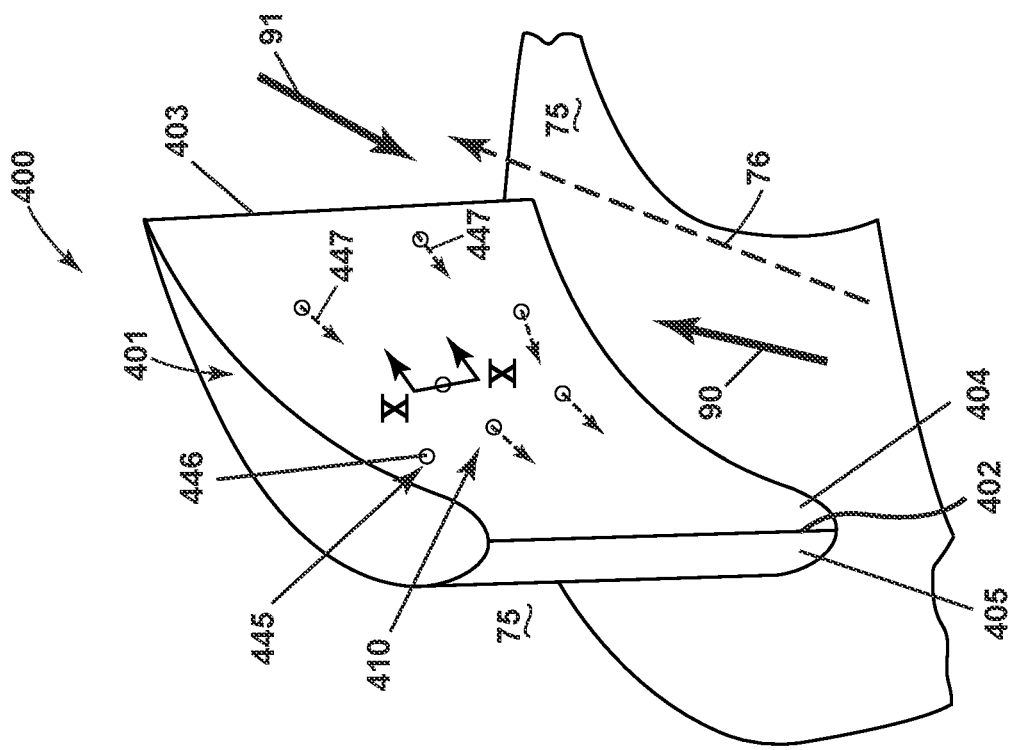
FIG. 9 is a schematic perspective view of another airfoil that can be utilized in the turbine center frame of FIG. 1 with another attenuation structure in accordance with various aspects described herein.

Referring now to FIG. 9, another airfoil 400 is illustrated that can be utilized in the turbine center frame 92. The airfoil 400 is similar to the airfoils 100, 200A, 200B, 300. Therefore, like parts will be identified with like numerals further increased by 100, with it being understood that the description of the like parts of the airfoil 100, 200A, 200B, 300 applies to the airfoil 400, except where noted.

The airfoil 400 has an outer wall 401 extending from a leading edge 402 to a trailing edge 403 and defining a pressure side 404 and suction side 405. At least one attenuation structure 410 can be provided on the outer wall 401 and is illustrated as being located on the pressure side 404. One difference is that the attenuation structure 410 is in the form of at least one cooling hole 445 with an outlet 446 on the outer wall 401. Cooling air 447 from within the airfoil 400 is illustrated exiting the outlets 446 in a direction at least partially opposite the flow direction 76. Put another way, the cooling holes 445 of the attenuation structure 410 can direct cooling air 447 at least partially in the upstream direction.

Figure 10:
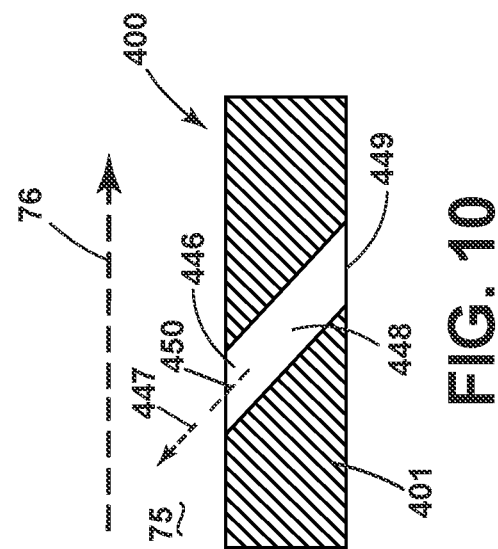
FIG. 10 is a cross-sectional view of a portion of the airfoil of FIG. 8 along line X-X.

FIG. 10 illustrates a cross-sectional view of one of the cooling holes 445. The cooling hole 445 extends along a passage 448 between an inlet 449 and the outlet 446. The inlet 449 can be fluidly coupled to a source of cooling air within an interior of the airfoil 400, including bleed air 77 (FIG. 1). The outlet 446 can define an outlet centerline 450 that is at least partially anti-aligned with the flow direction 76 as shown. While the passage 448 is illustrated as having a linear geometry, it will be understood that any suitable geometric profile can be utilized, including straight or curved segments, metering passages, diffusing sections, or the like, or combinations thereof.

During operation, the shockwave 90 or the reflected portion 91 can propagate along the flow direction 76 and onto or along the outer wall 401. Cooling air 447 can flow out of the cooling holes 445 at least partially opposite the flow direction 76, confronting the shockwave 90 or the reflected portion 91. Thus the cooling air 447 can remove energy or otherwise disrupt the shockwave 90 or the reflected portion 91, thereby dissipating or attenuating the shockwave 90 or the reflected portion 91. In this manner, the attenuation structure 410 can utilize flow disruption to attenuate the shockwave 90 or the reflected portion 91.

Figure 11:
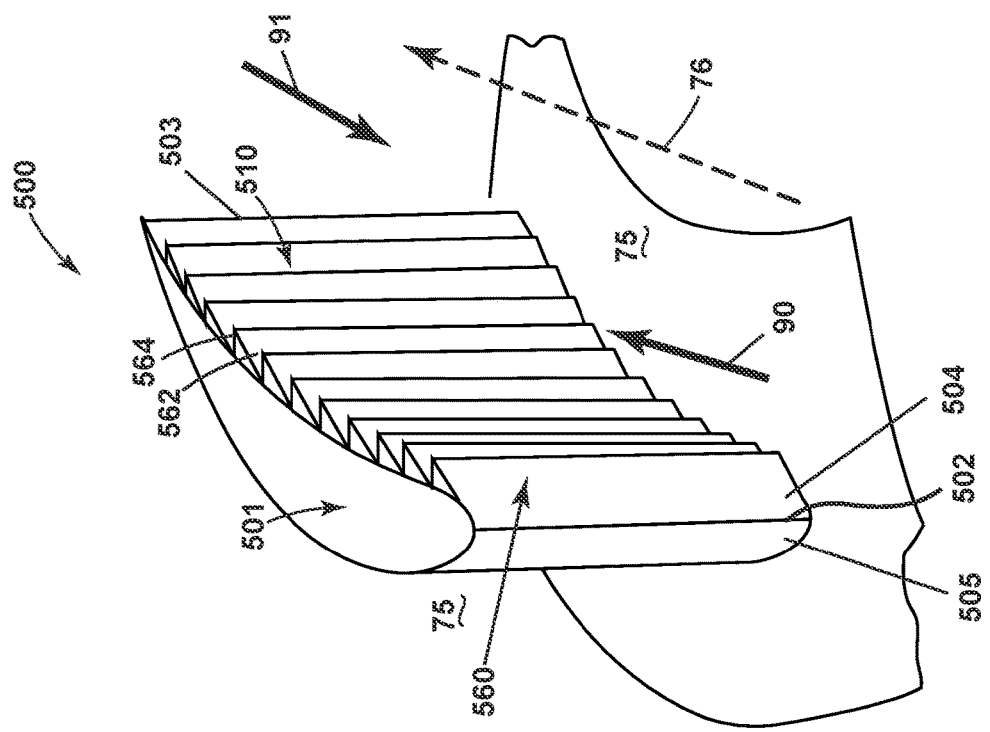
FIG. 11 is a schematic perspective view of another airfoil that can be utilized in the turbine center frame of FIG. 1 with another attenuation structure in accordance with various aspects described herein.

Referring now to FIG. 11, another airfoil 500 is illustrated that can be utilized in the turbine center frame 92. The airfoil 500 is similar to the airfoils 100, 200A, 200B, 300, 400. Therefore, like parts will be identified with like numerals further increased by 100, with it being understood that the description of the like parts of the airfoil 100, 200A, 200B, 300, 400 applies to the airfoil 500, except where noted.

The airfoil 500 has an outer wall 501 extending from a leading edge 502 to a trailing edge 503 and defining a pressure side 504 and suction side 505. At least one attenuation structure 510 can be provided on the outer wall 501 and is illustrated as being located on the pressure side 504. One difference is that the attenuation structure 510 is in the form of a set of ramped structures 560 protruding into the flow path 75. The set of ramped structures 560 is illustrated on the pressure side 504, and it is also contemplated that ramped structures can be located on the suction side 505 as well.

Each of the set of ramped structures 560 is illustrated extending fully over the pressure side 504 of the airfoil 500, though this need not be the case. The set of ramped structures 560 can have a generally triangular or "sawtooth" geometric profile with a surface 562 extending from the outer wall 501 and protruding into the flow path 75 to form a ramp end 564 as shown. The surfaces 562 and ramp ends 564 can be oriented with respect to the flow direction 76 to confront the reflected portion 91 of the shockwave 90 that travels against the flow direction 76 as shown. In this manner, the attenuation structure 510 can be arranged to attenuate reflected portions of shockwaves generated along the flow path during operation of the engine 10. It is contemplated that the surfaces 562 and ramp ends 564 can be formed with a variety of orientations to attenuate or dampen the shockwave 90 or reflected portion 91 moving in a variety of directions while flowing along the outer wall 501.

Figure 12:
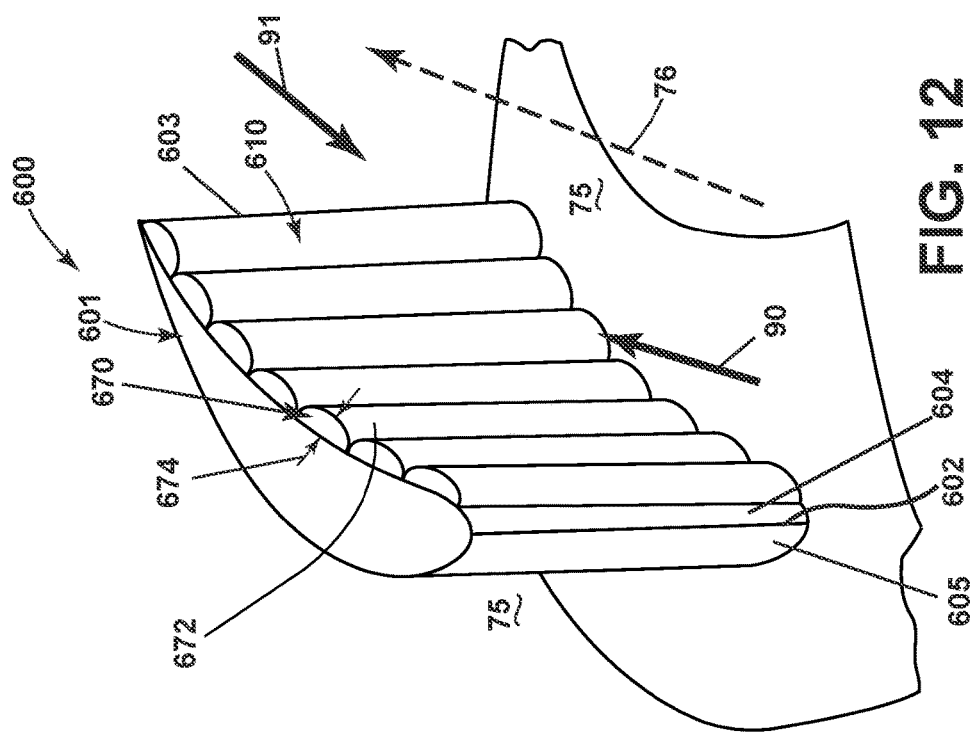
FIG. 12 is a schematic perspective view of another airfoil that can be utilized in the turbine center frame of FIG. 1 with another attenuation structure in accordance with various aspects described herein.

Referring now to FIG. 12, another airfoil 600 is illustrated that can be utilized in the turbine center frame 92. The airfoil 600 is similar to the airfoils 100, 200A, 200B, 300, 400, 500. Therefore, like parts will be identified with like numerals further increased by 100, with it being understood that the description of the like parts of the airfoil 100, 200A, 200B, 300, 400, 500 applies to the airfoil 600, except where noted.

The airfoil 600 has an outer wall 601 extending from a leading edge 602 to a trailing edge 603 and defining a pressure side 604 and suction side 605. At least one attenuation structure 610 can be provided on the outer wall 601 and is illustrated as being located on the pressure side 604. One difference is that the attenuation structure 610 is in the form of a set of curved structures 670 protruding into the flow path 75. The set of curved structures 670 is illustrated on the pressure side 604, and it is also contemplated that curved structures can be located on the suction side 605 as well.

Each of the set of curved structures 670 is illustrated extending fully over the pressure side 604 of the airfoil 600, though this need not be the case. The set of curved structures 670 is shown having semi-circular outer surfaces 672 extending from the outer wall 501 and protruding into the flow path 75 as shown. The outer surfaces 672 can define a maximum width 674 extending away from the airfoil outer wall 601. The maximum width 674 can be between 1 mm and 20 mm, or between 1 cm and 5 cm, in non-limiting examples. It is further contemplated that the maximum width 674 can be selected, sized, or the like with respect to a dimension of the airfoil 600, such as between 0% and 1% of a spanwise height similar to the spanwise height 106, or between 0% and 1% of a chordwise length similar to the chordwise length 107 (FIG. 2), in non-limiting examples. Such an arrangement can provide for attenuation of the shockwave 90 or the reflected portion 91 as they move over the curvatures of the attenuation structures 610.

Figure 13:
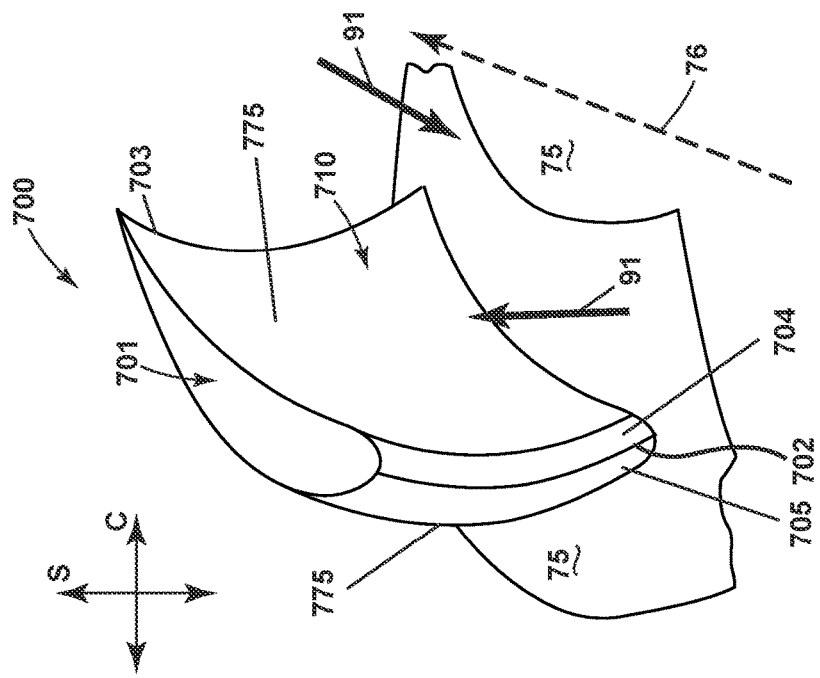
FIG. 13 is a schematic perspective view of another airfoil that can be utilized in the turbine center frame of FIG. 1 with another attenuation structure in accordance with various aspects described herein.

Referring now to FIG. 13, another airfoil 700 is illustrated that can be utilized in the turbine center frame 92. The airfoil 700 is similar to the airfoils 100, 200A, 200B, 300, 400, 500, 600. Therefore, like parts will be identified with like numerals further increased by 100, with it being understood that the description of the like parts of the airfoil 100, 200A, 200B, 300, 400, 500, 600 applies to the airfoil 700, except where noted.

The airfoil 700 has an outer wall 701 extending from a leading edge 702 to a trailing edge 703 and defining a pressure side 704 and suction side 705. The outer wall 701 extends in a span-wise direction S as shown, and a circumferential direction C is also shown for the turbine center frame 92 (FIG. 2).

At least one attenuation structure 710 can be provided on the outer wall 701. One difference is that the attenuation structure 710 is in the form of a bowed wall portion 775. In the example shown, both the pressure side 704 and the suction side 705 form a bowed portion 775 along the circumferential direction C as shown. Put another way, when moving along the span-wise direction S, both the pressure side 704 and the suction side 705 also extend at least partially in the circumferential direction C to form the bowed wall portions 775. The bowed wall portions 775 can be convex or concave.

During operation, the shockwave 90 or reflected portion 91 can encounter the bowed wall portion 775, which can act to disrupt, redirect, or introduce turbulence to the shockwave 90 or reflected portion 91, thereby attenuating the shockwave 90 or reflected portion 91. In one example, the bowed wall portion 775 can create a local pressure gradient within the working air flow such that the shockwave 90 or reflected portion 91 are disrupted when flowing over the bowed wall portion 775. In another example, the bowed wall portion 775 can focus or otherwise redirect the incident shockwave 90 or reflected portion 91 toward a benign region of the flow path 75, such as a platform, endwall, or other region in which an incident shock wave can have reduced undesirable effects. In this manner, the bowed wall portion 775 can function to disperse incident shock waves or to reflect incident shock waves toward a predetermined location within the engine 10.

Figure 14:
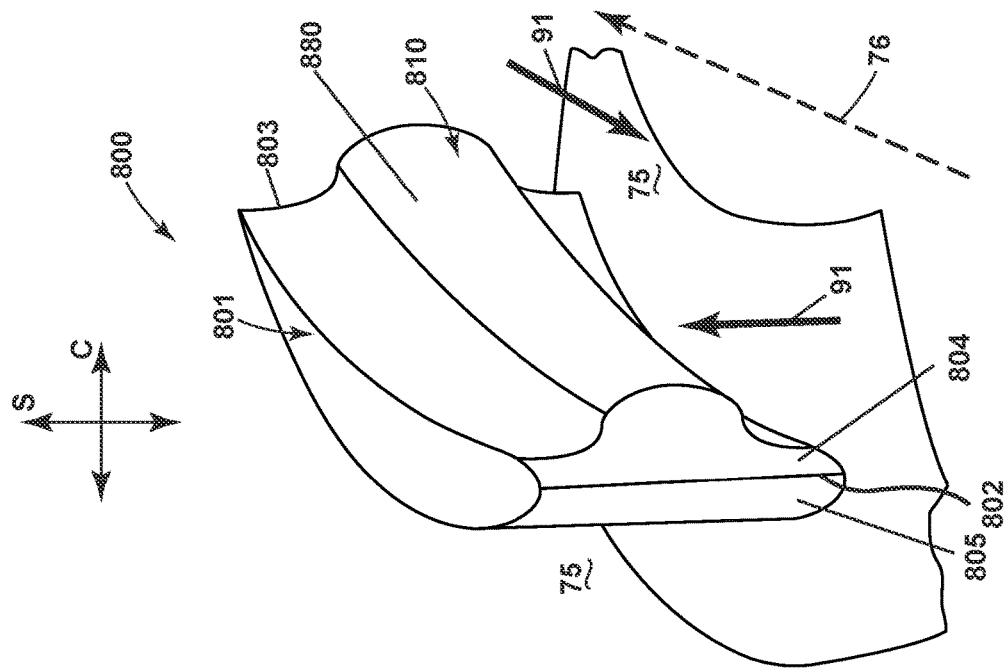
FIG. 14 is a schematic perspective view of another airfoil that can be utilized in the turbine center frame of FIG. 1 with another attenuation structure in accordance with various aspects described herein.

Referring now to FIG. 14, another airfoil 800 is illustrated that can be utilized in the turbine center frame 92. The airfoil 800 is similar to the airfoils 100, 200A, 200B, 300, 400, 500, 600, 700. Therefore, like parts will be identified with like numerals further increased by 100, with it being understood that the description of the like parts of the airfoil 100, 200A, 200B, 300, 400, 500, 600, 700 applies to the airfoil 800, except where noted.

The airfoil 800 has an outer wall 801 extending from a leading edge 802 to a trailing edge 803 and defining a pressure side 804 and suction side 805. The outer wall 801 extends in a span-wise direction S as shown, and a circumferential direction C is also shown for the turbine center frame 92 (FIG. 2).

At least one attenuation structure 810 can be provided on the outer wall 801. One difference is that the attenuation structure 810 is in the form of a convex bowed portion 880 located on the pressure side 804. In the example shown, the convex bowed portion 880 extends fully between the leading edge 802 and trailing edge 803. The convex bowed portion 880 protrudes outward into the flow path 75 in the circumferential direction C.

During operation, the shockwave 90 or reflected portion 91 can encounter the convex bowed portion 880, which can act to disrupt, redirect, or introduce turbulence to the shockwave 90 or reflected portion 91. For example, the convex bowed portion 880 can create a local pressure gradient within the working air flow such that the shockwave 90 or reflected portion 91 are disrupted when flowing over the convex bowed portion 880. In another example, the convex bowed portion 880 can redirect the shockwave 90 or reflected portion 91 in multiple directions so as to scatter the shockwave 90 or reflected portion 91. In this manner, the attenuation structure 810 protruding into the flow path 75 can at least partially attenuate, dissipate, disperse, or scatter the shockwave 90 or reflected portion 91.

With reference to FIGS. 1-14, aspects of the disclosure provide for a method of operating the turbine engine 10 having the engine core 44 having a compressor, combustor, and turbine in axial flow arrangement, such as the LP compressor 24, HP compressor 26, combustor 30, HP turbine 34, and LP turbine 36 (FIG. 1), whereby a working airflow passes through the engine core 44 from the compressor 24, 26 to the turbine 34, 36 to define the flow direction 76 through the engine core 44. The method includes generating the shockwave 90 in the working airflow that propagates in the flow direction 76. The shockwave 90 can be formed in one example by rotating a set of airfoils in one of the compressor or the turbine, such as the LP compressor blades 56, HP compressor blades 58, HP turbine blades 68, or LP turbine blades 70 (FIG. 1). Additionally or alternatively, the shockwave 90 can be formed by supersonic expansion of the working airflow through adjacent vanes, including HP turbine vanes 72 or LP turbine vanes 74 (FIG. 1). The method also includes directing the shockwave 90 over at least one attenuation structure 110, 210, 310, 410, 510, 610, 710, 810 on at least one component within the engine 10, such as the airfoil 100, 200A, 200B, 300, 400, 500, 600, 700, 800, to at least partially attenuate the shockwave 90. The method can also include directing the shockwave 90 between two circumferentially-spaced airfoils, such as the airfoils 200A, 200B (FIG. 6). The method can further include directing a reflected portion 91 of the shockwave 90 over a second attenuation structure 110, 210, 310, 410, 510, 610, 710, 810 on a second component within the engine 10, such as the airfoil 100, 200A, 200B, 300, 400, 500, 600, 700, 800, to attenuate the reflected portion 91. The method can include flowing a cooling airflow, such as the cooling air 447, from an interior of the at least one component, such as the airfoil 400, into the flow path 75 in a direction opposite the flow direction 76 (FIGS. 9-10).

Some particular examples of operation will be described below. It will be understood that such examples are intended to illustrate aspects of the disclosure and do not limit the disclosure in any way.

In one example, a shockwave can be generated by high-speed rotation of an HP turbine blade. The shockwave can propagate along the flow path, through the turbine center frame, and encounter a downstream engine component in the form of an LP turbine vane having an attenuation structure in the form of multiple scaled structures over both the pressure side and suction side. The shockwave can form a reflected portion off the leading edge of the LP turbine vane, traveling upstream, as well as a transmitted portion moving over the LP turbine vane, traveling downstream. The transmitted portion of the shockwave can be reduced by 50% in amplitude due to the attenuation structure. The reflected portion can travel upstream, back through the turbine center frame, and encounter a second component in the form of an airfoil in the turbine center frame having a second set of attenuation structures in the form of ramped structures with ramp surfaces confronting the reflected portion. The reflected portion of the shockwave can travel over the ramped structures, which act to attenuate the reflected portion of the shockwave. In this manner, attenuation structures can be utilized on engine components to attenuate shockwaves emanating from both upstream and downstream directions.

In another example, an airfoil in the turbine center frame can have multiple types of attenuation structures based on the type of shock wave most likely to be encountered at that location. More specifically, a pressure side of the airfoil as well as a platform at the root of the airfoil can include multiple resonator cavities tuned to attenuate a particular wave harmonic from the presence of a downstream-traveling shockwave, while a suction side of the airfoil and portions of the platform adjacent thereto can include multiple raised panels to attenuate reflected shockwaves from other downstream components.

Aspects of the disclosure can be utilized to mitigate the impact of shockwaves on downstream engine components, including through the use of local surface features or protrusions. The shockwaves can be generated by rotation of upstream blades or through supersonic expansion through upstream nozzles. Regardless of how the shockwaves are formed, the attenuation structures described herein can disperse such shockwaves by reducing primary reflections, reducing harmonic reflections, removing energy from the wave front, disrupting the wave front using surfaces or counter-flowing cooling air, or the like.

A variety of benefits can be realized from the present disclosure. One advantage is that the use of attenuation structures provides for a reduction in pressure gradients within the working airflow to minimize loss and mixing loss between upstream and downstream waves. Another benefit is the dispersion or "smearing" of shockwave gradients and lessening the strength of shockwaves traveling in the flow path, which provides for more work extracted from the working airflow and greater component longevity in operation. Another benefit is a reduction in amplitude of unsteady blade loading, thereby minimizing unsteady losses on airfoil surface due to shock pressure gradients. Still another benefit is a reduction in shock-wake interaction through diffusion of the shockwave, via the attenuation structures, such that an upstream-traveling reflected shockwave mixes at lower loss with a downstream-traveling shockwave.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

1. A method of operating a turbine engine having an engine core comprising a compressor, combustor, and turbine in axial flow arrangement, whereby a working airflow passes through the engine core from the compressor to the turbine to define a flow direction through the engine core, the method comprising generating a shockwave in the working airflow that propagates in the flow direction, and directing the shockwave over at least one attenuation structure on at least one component within the turbine engine to at least partially attenuate the shockwave.

2. The method of any preceding clause wherein the at least one component comprises at least one of an airfoil, an inner band, or an outer band.

3. The method of any preceding clause wherein the at least one attenuation structure comprises at least one of a scaled structure, a raised panel, a raised ridge, a resonator cavity, or a bowed surface portion.

4. The method of any preceding clause wherein the at least one component comprises an airfoil with an outer surface defining a pressure side and a suction side and extending between a leading edge and a trailing edge.

5. The method of any preceding clause wherein the at least one attenuation structure is located on the pressure side of the airfoil.

6. The method of any preceding clause wherein the at least one component further comprises a turbine center frame having the airfoil.

7. The method of any preceding clause, further comprising flowing a cooling airflow from an interior of the at least one component into the working airflow in a direction opposite the flow direction.

8. The method of any preceding clause, further comprising directing a reflected portion of the shockwave over a second attenuation structure on a second component to attenuate the reflected portion.

9. The method of any preceding clause wherein the second attenuation structure comprises one of a scaled structure, a raised panel, a raised ridge, a resonator cavity, or a bowed surface portion.

10. The method of any preceding clause wherein the at least one attenuation structure comprises a resonator cavity with an inlet on an outer surface of the at least one component and in fluid communication with the working airflow.

11. The method of any preceding clause wherein the at least one component comprises two circumferentially-spaced airfoils, and wherein the directing further comprises directing the shockwave between the two circumferentially-spaced airfoils.

12. The method of any preceding clause wherein the shockwave comprises a pressure wave within a subsonic flow.

13. A turbine engine, comprising an engine core comprising a compressor, combustor, and turbine in axial flow arrangement, a flow path extending through the engine core from the compressor to the turbine to define a flow direction for a working airflow through the engine core, a rotatable set of airfoils in one of the compressor or turbine, whereby rotation of the set of airfoils generates a shockwave in the working airflow; and at least one component in the flow path comprising an outer surface with at least one attenuation structure configured to at least partially attenuate the shockwave flowing thereon.

14. The turbine engine of any preceding clause wherein the at least one attenuation structure comprises at least one of a scaled structure, a raised panel, a raised ridge, a resonator cavity, or a bowed surface portion.

15. The turbine engine of any preceding clause wherein the at least one attenuation structure protrudes from the outer surface into the flow path.

16. The turbine engine of any preceding clause, further comprising a second component comprising a second attenuation structure configured to attenuate a reflected shockwave flowing thereon.

17. The turbine engine of any preceding clause wherein the at least one component comprises an airfoil with the outer surface defining a pressure side and a suction side and extending between a leading edge and a trailing edge.

18. The turbine engine of any preceding clause wherein the at least one attenuation structure comprises a bowed portion in the outer surface.

19. The turbine engine of any preceding clause wherein the airfoil comprises a set of cooling holes having corresponding outlets aligned at least partially in a direction opposite the flow direction.

20. The turbine engine of any preceding clause wherein the at least one attenuation structure comprises a resonator cavity with an inlet on an outer surface of the at least one component and fluidly coupled to the flow path.

What is claimed is:

1. A turbine engine, comprising:
   an engine core comprising a compressor, a combustor, and a turbine in axial flow arrangement;
   a flow path extending through the engine core from the compressor to the turbine to define a flow direction for a working airflow through the engine core;
   a component comprising an outer surface with at least one attenuation structure protruding into the flow path; and
   a rotatable set of airfoils in one of the compressor or the turbine, whereby rotation of the set of airfoils forms the working airflow having a shockwave propagating onto the outer surface of the component and at least partially attenuated by the at least one attenuation structure;
   wherein the at least one attenuation structure comprises at least one of a set of raised ridges in the outer surface or a set of raised panels in the outer surface, the at least one of the set of raised ridges or the set of raised panels arranged to form a set of honeycomb structures.

2. The turbine engine of claim 1, wherein the at least one attenuation structure comprises at least one of a scaled structure, a ramped structure, a curved structure, or a bowed wall portion.

3. The turbine engine of claim 1, wherein the at least one attenuation structure comprises a set of scaled structures covering at least a portion of the outer surface and protruding into the flow path.

4. The turbine engine of claim 1, wherein the at least one attenuation structure comprises a set of ramped structures with ramp ends protruding into the flow path.

5. The turbine engine of claim 1, wherein the at least one attenuation structure comprises a set of curved structures with rounded surfaces protruding into the flow path.

6. The turbine engine of claim 1, wherein the at least one attenuation structure comprises a convex bowed wall portion extending over the outer surface and protruding into the flow path.

7. The turbine engine of claim 1, further comprising a second component comprising a second attenuation structure attenuating a reflected shockwave flowing thereon, the second attenuation structure comprising one of a second set of honeycomb structures, a raised ridge, a scaled structure, a ramped structure, a curved structure, or a bowed wall portion.

8. The turbine engine of claim 1, wherein the component comprises an airfoil with the outer surface defining a pressure side and a suction side and extending between a leading edge and a trailing edge.

9. The turbine engine of claim 8, wherein the at least one attenuation structure is located on the pressure side of the airfoil.

10. The turbine engine of claim 1, wherein the component comprises a turbine center frame having at least one of an airfoil, an inner band, or an outer band.

11. The turbine engine of claim 1, wherein the shockwave comprises a pressure wave within a subsonic flow.

12. A method of operating a turbine engine having an engine core comprising a compressor, combustor, and turbine in axial flow arrangement, whereby a working airflow passes through the engine core from the compressor to the turbine to define a flow path through the engine core, the method comprising:
generating a shockwave in the working airflow that propagates onto an outer surface of a component within the turbine engine, the outer surface comprising at least one attenuation structure protruding into the flow path; and
directing the shockwave over the at least one attenuation structure to at least partially attenuate the shockwave;
wherein the at least one attenuation structure comprises at least one of a set of raised ridges in the outer surface or a set of raised panels in the outer surface, the at least one of the set of raised ridges or the set of raised panels arranged to form a set of honeycomb structures.

13. The method of claim 12, wherein the component comprises one of an airfoil, an inner band, or an outer band.

14. The method of claim 12, wherein the at least one attenuation structure comprises at least one of a scaled structure, a ramped structure, a curved structure, or a bowed wall portion.

15. The method of claim 14, wherein the component comprises an airfoil with the outer surface defining a pressure side and a suction side and extending between a leading edge and a trailing edge.

16. The method of claim 12, further comprising directing a reflected portion of the shockwave over a second attenuation structure on a second component to attenuate the reflected portion.

17. The method of claim 16, wherein the second attenuation structure comprises one of a second set of honeycomb structures, a raised ridge, a raised panel, a scaled structure, a ramped structure, a curved structure, or a bowed wall portion.

18. The method of claim 12, wherein the component comprises a pair of circumferentially-spaced airfoils, and wherein the directing further comprises directing the shockwave between the pair of circumferentially-spaced airfoils.

\* \* \* \* \*